United States Patent
Coxe et al.

(10) Patent No.: US 7,343,579 B2
(45) Date of Patent: Mar. 11, 2008

(54) RECONFIGURABLE ENVIRONMENTALLY ADAPTIVE COMPUTING

(75) Inventors: Robin L. Coxe, Boston, MA (US); Gary E. Galica, Medford, MA (US)

(73) Assignee: Physical Sciences, Andover, MA (US)

( * ) Notice: Subject to any disclaimer, the term of this patent is extended or adjusted under 35 U.S.C. 154(b) by 297 days.

(21) Appl. No.: 10/999,463

(22) Filed: Nov. 30, 2004

(65) Prior Publication Data

US 2006/0117164 A1    Jun. 1, 2006

(51) Int. Cl.
*G06F 17/50* (2006.01)
*G06F 11/00* (2006.01)
*G01R 31/28* (2006.01)

(52) U.S. Cl. .............. 716/16; 714/3; 714/725
(58) Field of Classification Search ........... 716/16–17; 455/84; 712/15, 226; 713/100; 714/2, 13, 714/25, 31, 42–43, 47, 54, 736, 762, 799, 714/725, 1, 3
See application file for complete search history.

(56) References Cited

U.S. PATENT DOCUMENTS

| | | | |
|---|---|---|---|
| 6,072,994 A * | 6/2000 | Phillips et al. ............. | 455/84 |
| 6,157,875 A * | 12/2000 | Hedman et al. ............ | 701/1 |
| 6,175,940 B1 * | 1/2001 | Saunders ................... | 714/746 |
| 7,036,059 B1 * | 4/2006 | Carmichael et al. ........ | 714/725 |
| 2002/0157071 A1 * | 10/2002 | Schiefele et al. ............ | 716/6 |
| 2004/0199813 A1 * | 10/2004 | Hillman et al. ............ | 714/13 |
| 2004/0247075 A1 * | 12/2004 | Johnson et al. ............ | 378/57 |
| 2004/0256568 A1 * | 12/2004 | Sekine et al. .......... | 250/370.11 |
| 2005/0040844 A1 * | 2/2005 | Plants ......................... | 326/9 |
| 2005/0078174 A1 * | 4/2005 | Casey et al. ................ | 348/61 |
| 2005/0193255 A1 * | 9/2005 | McCollum .................. | 714/30 |
| 2006/0020774 A1 * | 1/2006 | Ramos et al. .............. | 712/226 |

* cited by examiner

*Primary Examiner*—Paul Dinh
(74) *Attorney, Agent, or Firm*—Proskauer Rose LLP

(57) ABSTRACT

Described are methods and apparatus, including computer program products, for reconfigurable environmentally adaptive computing technology. An environmental signal representative of an external environmental condition is received. A processing configuration is automatically selected, based on the environmental signal, from a plurality of processing configurations. A reconfigurable processing element is reconfigured to operate according to the selected processing configuration. In some examples, the environmental condition is detected and the environmental signal is generated based on the detected condition.

31 Claims, 7 Drawing Sheets

RECONFIGURABLE ENVIRONMENTALLY ADAPTIVE COMPUTING

GOVERNMENT RIGHTS

The government may have certain rights in the invention under Contract No. F29601-02-C-0069 awarded by the United States Air Force and Contract No. NNA04CB32C awarded by NASA.

FIELD OF THE INVENTION

The present invention relates to reconfigurable environmentally adaptive computing.

BACKGROUND OF THE INVENTION

A reconfigurable processing device typically refers to an electronic device that can dynamically change its internal configuration during runtime to change the way input signals are processed. One example of such a device is a reconfigurable microprocessor. Another example of such a device is a reconfigurable field programmable gate array (FPGA). An FPGA is a form of programmable logic device (PLD) that includes of an array of logic that can be connected in a variety of ways to perform certain processing functions. Instead of being hardwired to operate in only one functional mode, a reconfigurable FPGA typically can be loaded with a configuration that defines how the logic is connected. A reconfigurable FPGA includes two types of functional elements: configurable interconnect logic and volatile memory (e.g., static random access memory (SRAM)), that stores the loaded configuration. In operation, the reconfigurable FPGA configures its programmable interconnect logic using the configuration data in the memory layer. When a new configuration is loaded into the memory layer, the reconfigurable FPGA reconfigures its programmable logic using the newly-loaded configuration.

Techniques have been described for monitoring the internal aspects of the reconfigurable FPGA for fault detection. For example, a technique involves continuously reading the volatile memory elements to verify that the configuration is not corrupted. Some techniques also include reconfiguring the FPGA when such an internal inspection discovers a fault in either the configurable logic element or the volatile memory element. See for example U.S. Pat. No. 6,526,559, which describes a method for creating circuit redundancy in programmable logic devices.

SUMMARY OF THE INVENTION

The description describes methods and apparatus, including computer program products, for reconfigurable environmentally adaptive computing. In general, in one aspect, there is an adaptive computing system. The adaptive computing system includes a detector, a controller element, and a processing element. The detector generates an environmental signal representative of an external environmental condition. The controller element receives the environmental signal from the detector and selects a processing configuration from a plurality of processing configurations based on the environmental signal. The processing element that reconfigures itself to operate in accordance with the selected processing configuration received from the controller.

In another aspect, there is a computer program product, tangibly embodied in an information carrier, for reconfigurable environmentally adaptive computing. The computer program product including instructions being operable to cause data processing apparatus to receive an environmental signal that represents an environmental condition external to the adaptive computing system, select a processing configuration from a plurality of processing configurations based on the environmental signal, and initiate the reconfiguring of a reconfigurable processing element to operate according to the selected processing configuration.

In another aspect, there is an adaptive computing system. The system includes a means for generating an environmental condition signal and a means for selecting a processing configuration from a plurality of processing configurations based on the environmental condition signal. The system also includes a means for reconfiguring a processing element to operate according to the selected processing configuration.

In another aspect, there is a method. The method includes receiving an environmental signal representative of an external environmental condition and selecting a processing configuration from a plurality of processing configurations based on the environmental signal. The method also includes reconfiguring a processing element to operate according to the selected processing configuration.

In other examples, any of the aspects can include one or more of the following features. The detector can include a sensor. The sensor can include a radiation detector. The radiation detector can include a scintillator and a photodiode. The sensor can include a location detector. The location detector can include a geographical positioning system sensor. The detector can include a single event upset detection circuit having a radiation detector. The detector can include a radiation detector and a location detector. The detector can include an image processing detection circuit. The environmental signal can be based on a characteristic of a processed image. The characteristic can include a particular feature within the processed image. The characteristic can include an unexpected feature within the processed image. The processing element can include a programmable logic device. The programmable logic device can include a field programmable gate array. The processing element can include a radiation-hardened programmable logic device. The environmental signal can be based on a characteristic of output data from the processing element. The processing element can accommodate high bandwidth applications.

The external environmental condition can be detected and the environmental signal can be generated based on the detected condition. The detecting can include detecting a radiation level. The processing configuration can be a first processing configuration. In such examples, an increase in the radiation level can be detected, and a second processing configuration that is more fault tolerant than the first processing configuration can be selected. Detecting can include detecting a position. Detecting can include detecting a particular condition within image data. Detecting can include detecting a particular feature within the image data. Detecting can include detecting an unexpected feature within the image data.

Implementations can realize one or more of the following advantages. A processing device can be reconfigured during runtime to operate based on the environment in which it operates, thus proactively preventing failures from occurring, instead of reacting to failures that have already occurred. As the environment changes, the reconfigurable processing device can reconfigure itself to adapt to the changing environment. This reconfiguration maximizes utilization of resources, as high performance, low power configurations can be used whenever possible. As the environment becomes harsher, the reconfigurable processing unit can configure itself to a more reliable and redundant, higher power configuration, only while the harsh environment remains. The environment cannot always be predicted or modeled, so by adapting the configuration to the current environment, the reconfigurable processing device can react to unexpected changes. Continual human intervention is not needed to readjust for the different changing environments. One implementation of the invention provides at least one of the above advantages.

The details of one or more examples are set forth in the accompanying drawings and the description below. Further features, aspects, and advantages of the invention will become apparent from the description, the drawings, and the claims.

DETAILED DESCRIPTION

Figure 1:
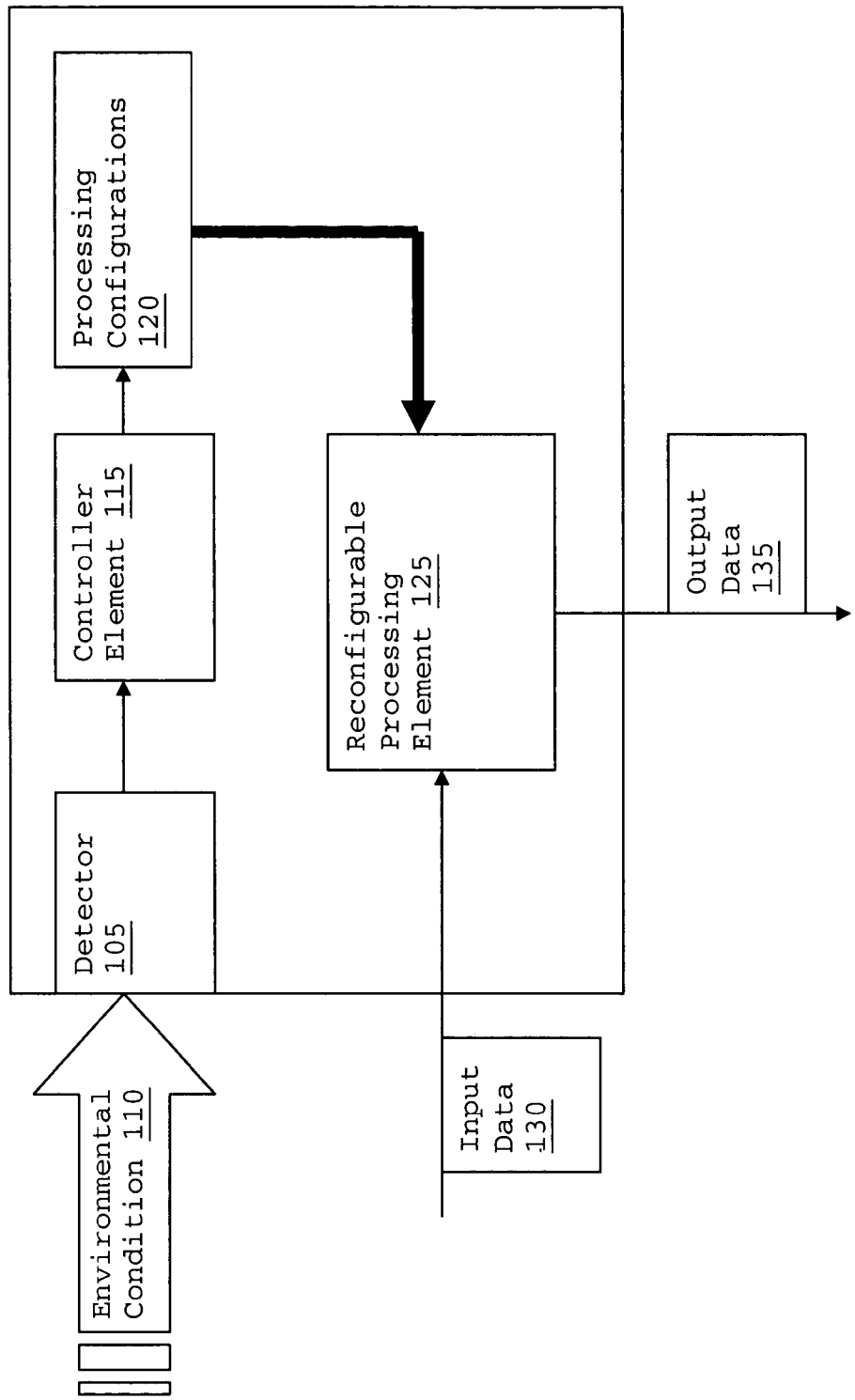
FIG. 1 is a block diagram of an exemplary reconfigurable environmentally adaptive computing system.

FIG. 1 illustrates a system 100 that can be used for reconfigurable, environmentally adaptive computing. The system 100 includes a detector 105 to detect an environmental condition 110 external to the system 100. Examples of an external environmental condition 110 can include, for example, a physical location of the system 100, a level or change of level of radiation exposure by the system 100, an event being processed by the system 100 (e.g., images of a volcano erupting), characteristics in images being processed by the system 100 (e.g., particular spatial or facial features), characteristics in hyperspectral images being processed by the system 100 (e.g., particular wavelengths or wavelength bands), etc. The detector 105 generates a signal based on the environmental condition 110 and transmits that signal to a controller element 115. Based on that signal, the controller element 115 selects a processing configuration from the processing configurations stored in a storage module 120 (e.g., non-volatile memory). Different configurations can be defined based on factors such as throughput, energy efficiency, power consumption, redundancy, and fault tolerance.

The controller element 115 initiates the transfer of the selected configuration from storage module 120 to a reconfigurable processing element 125 (e.g., reconfigurable FPGA). Upon receipt of the configuration data, the reconfigurable processing element 125 reconfigures itself according to the received configuration. Once configured, the reconfigurable processing element 125 processes input data 130 according to the new configuration to produce the output data 135. Some reconfigurable processing elements are partially reconfigurable, meaning that a portion of the programmable logic can be changed while another portion remains unchanged. This allows processing of data to continue in the unchanged portion while the changed portion is reconfigured. See, for example, the Virtex-II family of reconfigurable FPGAs manufactured by Xilinx, Inc. of San Jose, Calif.

As a simple example, the external environmental condition 110 can be the location of the system 100. For this example, the detector 105 includes a global positioning system (GPS) receiver that calculates an accurate position of the system 100. The detector 105 sends the coordinates representing the location of the system 100 to the controller element 115. The controller element 115 selects the configuration that corresponds to the location of system 100. For example, if the system 100 is recording images as it travels and is located at a location of interest, the controller element 115 selects a configuration to process the images in a high-resolution mode. When the system 100 moves out of the location of interest and the detector 105 transmits new location information, the controller element 115 selects a configuration to process images in a low resolution mode, thus advantageously conserving resources. The processing element 125 reconfigures itself and starts processing the images in a low-resolution mode.

Figure 2:
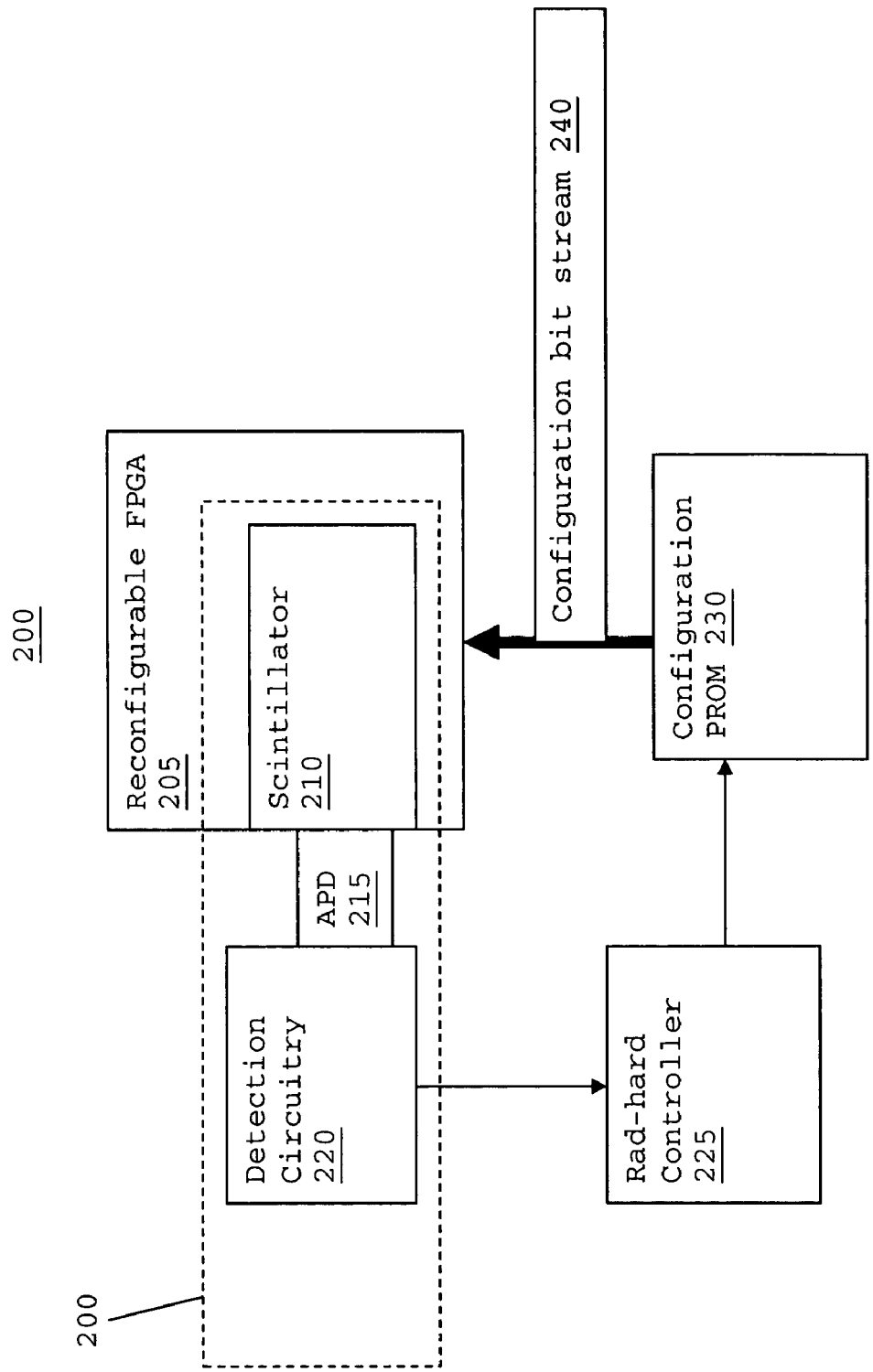
FIG. 2 is a block diagram of another exemplary reconfigurable environmentally adaptive computing system.

FIG. 2 illustrates a system 200 that also can be used for reconfigurable, environmentally adaptive computing. The system 200 includes a reconfigurable FPGA 205, a scintillator 210, an avalanche photodiode 215, detection circuitry 220, a radiation-hardened controller 225 and a configuration programmable read-only memory (PROM) 230. In the system 200, the external environmental condition monitored is radiation exposure by the FPGA. The combination of the scintillator 210, the avalanche photodiode 215, and the detection circuitry 220 can collectively be a detector that is sometimes referred to as a single event upset (SEU) alarm 240. The SEU alarm 240 detects radiation events commonly associated with SEUs. SEUs commonly refer to transient errors in data and they are typically non-destructive to the hardware. According to the NASA thesaurus, single event upset (SEU) is radiation-induced errors in microelectronic circuits caused when charged particles (e.g., from the radiation belts or from cosmic rays) lose energy by ionizing the medium through which they pass, leaving behind a wake of electron-hole pairs. The SEU alarm 240 provides continuous monitoring of the proton and heavy-ion fluxes that cause single event upsets.

The illustrated example of the SEU Alarm 240 includes a small block of scintillator 210 coupled to the avalanche photodiode (APD) 215. The scintillator 210 and the avalanche photodiode (APD) 215 output an analog voltage proportional to either instantaneous flux or fluence of incident charged particles. The controller 225 receives the analog voltage from the APD 215 and sends warnings, via status lines, when the flux or fluence exceeds user-determined limits. In one example, the SEU alarm 220 approximately weighs 25 grams, occupies a volume of 10×10×30 mm$^3$, and consumes 20 mW of power. In this example, the SEU alarm 240 is small enough to be placed directly over or beside the FPGA 205, thereby measuring the SEU-inducing environment in close proximity to the FPGA 205. When the SEU alarm 240 detects a potentially hazardous environment, the SEU alarm 240 sends an alarm signal to the controller 225. A finite state machine executing on the microcontroller 225 prompts the FPGA configuration PROM 230 to change the reconfiguration of the FPGA to one or more "robust"

processing modes by transmitting the stored configuration 240 to the FPGA 205. When the environment returns to a benign state, the controller 225 automatically reconfigures the FPGA 205 back to a default "high throughput" mode.

Figure 3:
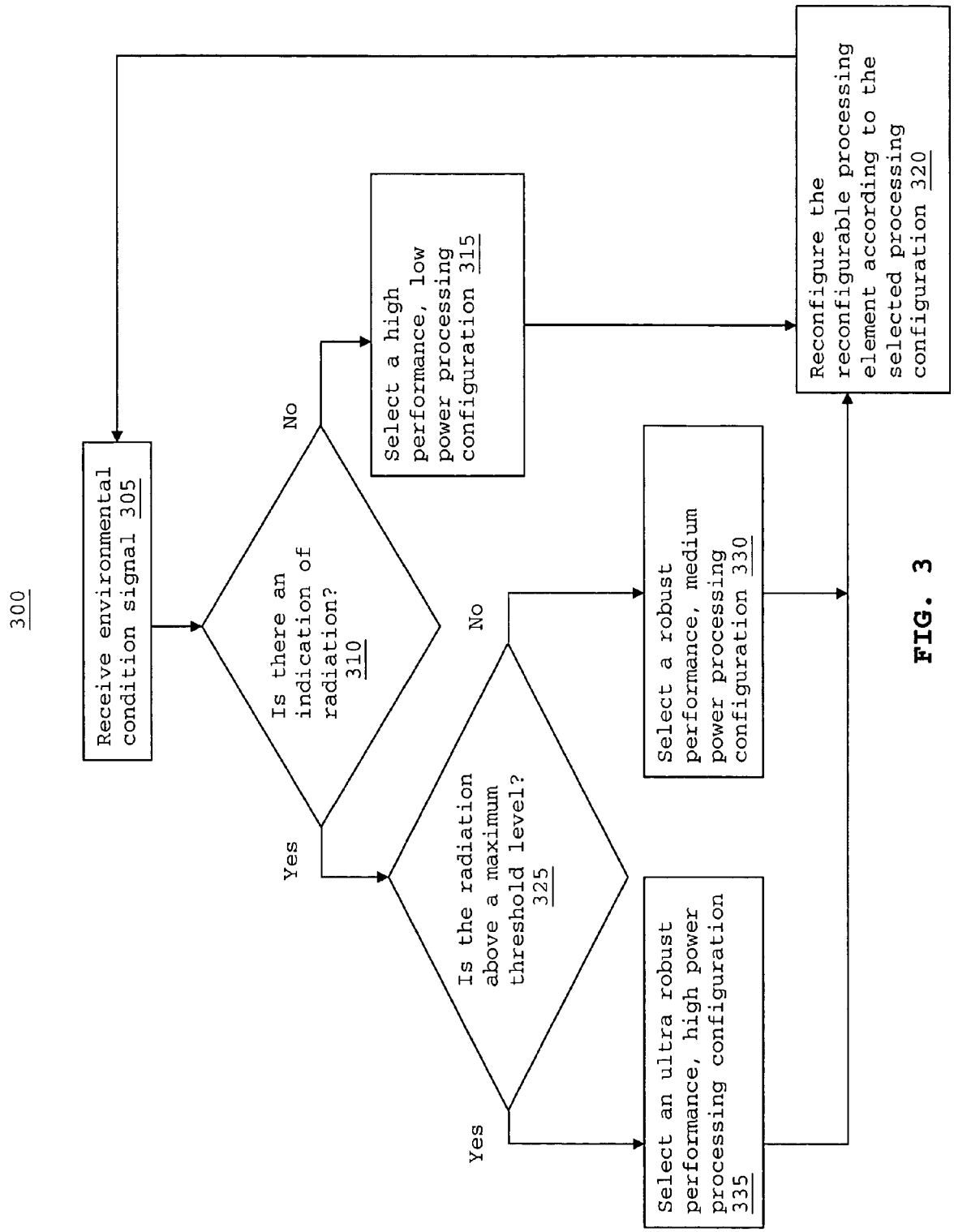
FIG. 3 is a block diagram of an exemplary process of reconfigurable environmentally adaptive computing.

FIG. 3 illustrates an exemplary process 300 of reconfigurable environmentally adaptive computing using, for example, the exemplary system 200. The controller 225 receives (305) an environmental condition signal from the SEU alarm 235 indicating radiation exposure. In one example, the signal is a two bit signal, with the first bit indicating whether some minimum level of radiation is present and the second bit indicating whether a maximum threshold has been exceeded. The controller 225 determines (310) whether there is an indication of radiation. For example, using the two bit example, the controller reads the first bit, where a logic zero indicates that the minimum level has not been exceeded and a logic one indicates that the minimum level has been exceeded. If the controller 225 determines (310) that there is no indication of radiation (e.g., logic zero), then the controller 225 selects a configuration from configuration PROM 230 that represents a high performance, low power processing configuration, as the threat of a SEU is low. The configuration PROM 230 transmits the selected configuration to the FPGA 205 and the FPGA 205 reconfigures (320) itself according to the received configuration.

If the controller 225 determines (310) that there is an indication of radiation (e.g., logic one), then the controller 225 determines (325) whether the radiation has exceeded a maximum threshold. For example, using the two bit example, the controller reads the second bit, where a logic zero indicates that the maximum level has not been exceeded and a logic one indicates that the maximum level has been exceeded.

If the controller 225 determines (325) that the maximum level has not been exceeded (e.g., logic zero), then the controller 225 selects a configuration from configuration PROM 230 that represents a robust performance, medium power processing configuration, as the threat of a SEU is increasing. For example, a robust performance can include scrubbing the configuration bit stream and enabling partial reconfiguration of the FPGA 205. The configuration PROM 230 transmits the selected configuration to the FPGA 205 and the FPGA 205 reconfigures (320) itself according to the received configuration. If the controller 225 determines (325) that the maximum level has been exceeded (e.g., logic one), then the controller 225 selects a configuration from configuration PROM 230 that represents an ultra-robust performance, high power processing configuration, as the threat of a SEU is high. For example, an ultra-robust performance can include scrubbing the configuration bit stream, enabling partial reconfiguration of the FPGA 205, and using triple modular redundancy logic. The configuration PROM 230 transmits the selected configuration to the FPGA 205 and the FPGA 205 reconfigures (320) itself according to the received configuration.

Process 300 is a continuous loop, so that the controller 225 continuously monitors the environment and adapts the FPGA accordingly, using one of the stored configurations. To perform the continuous monitoring, the controller 225 can periodically query the detection circuitry 220 to obtain an updated environmental condition signal. In other examples, the environmental condition signal can be a voltage level (e.g., zero or five volts) on an input port of the controller 225 that is generated by the detection circuitry 220. This continuous loop enables the system 200 to autonomously reconfigure the mode (e.g., normal, robust, or ultra-robust) in which the FPGA 205 processes data based on the changing environmental conditions (e.g., amount of detected radiation). This autonomous mode switching is advantageous in many typical satellite orbits, such as low Earth orbit (LEO) polar orbits where satellites pass through the South Atlantic Anomaly, geostationary equatorial orbit (GEO) transfer orbits where the satellites traverse the radiation belts, and geosynchronous orbits where satellites are subjected to geomagnetic disturbances and solar proton events.

Figure 4:
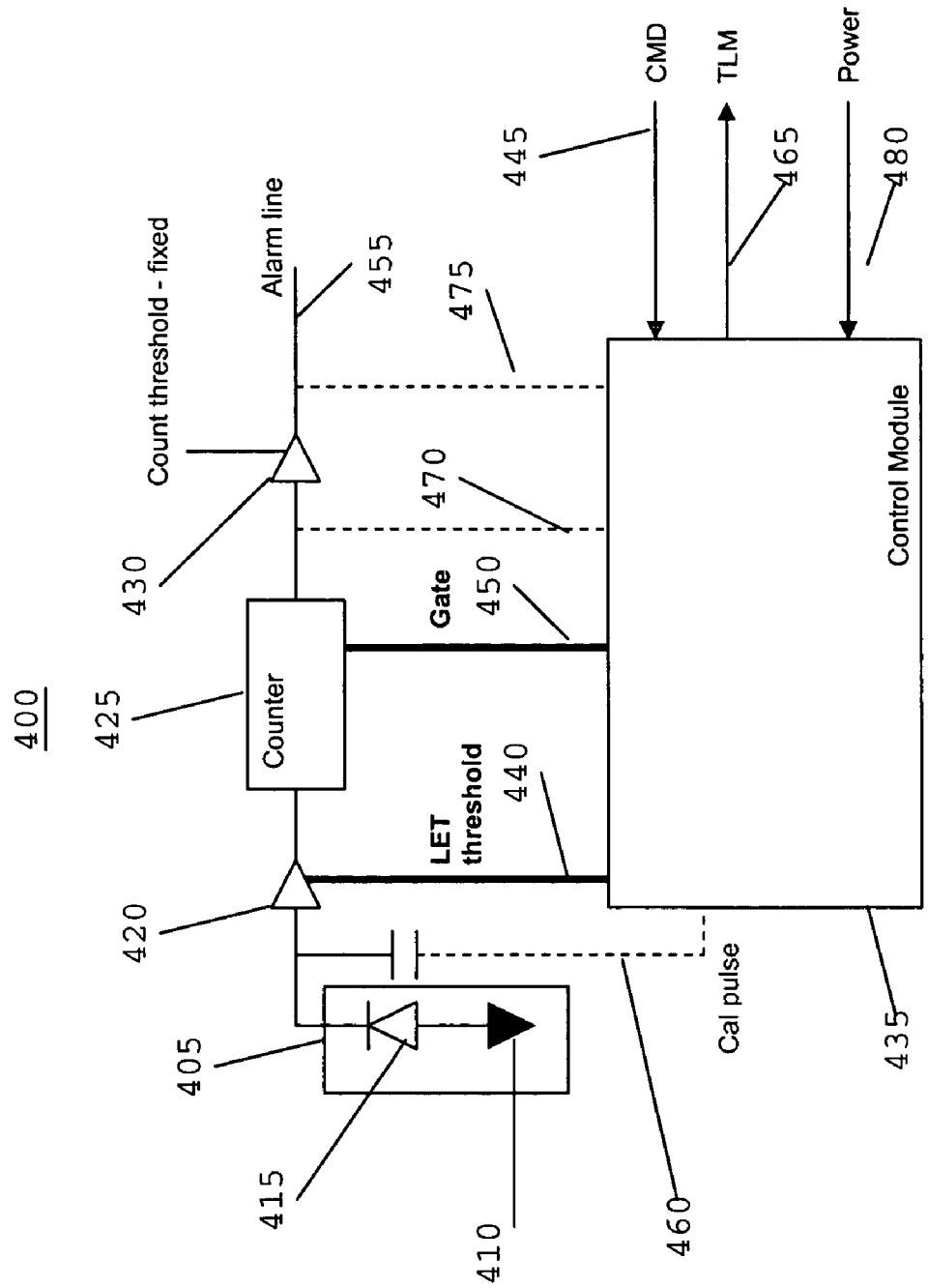
FIG. 4 is a block diagram of an exemplary radiation detecting circuit.

FIG. 4 illustrates another example of a SEU alarm 400. The SEU alarm 400 includes a detector 405 (e.g., scintillator 410 and photodiode 415), analog preamp and discriminator 420, gated counter 425, comparator 430, and control module 435. In some examples, the SEU alarm 400 can be manufactured using a combination of parts available from various vendors. Table 1 includes a list of components and examples of one or more vendor parts that can be used to implement that particular component.

TABLE 1

| COMPONENT | VENDOR | PART NUMBER |
|---|---|---|
| Scintillator | Bicron | BC400 Plastic Scintillator |
| | Rexon | Yttrium Aluminum Perovskite scintillator |
| Photodiode | Hamamatsu | S3399 PIN photodiode |
| | Hamamatsu | C5331 Avalanche photodiode |
| | Hamamatsu | R7400 Photomultiplier tube |
| Analog Preamplifier | Amptek | A203 Charge-sensitive preamplifier |
| | ADI | LF312 Operational amplifier |
| Counter | Toshiba | 74HC593 Digital counter |

As described above, the scintillator 410 and the photodiode 410 of the detector 405 output an analog voltage proportional to either instantaneous flux or fluence of incident charged particles. The analog preamp and discriminator 420 receives this signal and amplifies the level (e.g., analog preamp portion), and screens any signals below a certain level (e.g., discriminator portion).

A user can set the screening level through the control module 435. The control module 435 provides a linear energy transfer (LET) threshold signal 440 to the analog preamp and discriminator 420 to set the screening level. Linear energy transfer (LET) is a measure of the energy transferred to a device per unit length as an ionizing particle travels through a material and is typically measured in MeV-cm2/mg of material (Si for MOS devices). The LET threshold signal 440 allows the user to adjust the particle energy (or LET) that signifies a "SEU-relevant" particle. This threshold determines which particles are counted by the counter 425. In one example, the LET threshold signal 440 is an 8 to 10 bit signal generated by the control module 435 with a magnitude of 0-5 volts, and an output impedance of less than or equal to 50 ohms. The user can set the level, for example, using a computing device in communication with the command input port 445 of the control module 435. Alternatively, in a case where the control module 435 is not used, the SEU alarm 400 can include one or more switches that the user can set to adjust the LET threshold value.

Any signals from the detector 405 that represent particles with energy above the LET threshold are passed through the analog preamp and discriminator 420 to the counter 425. The counter 425 counts the particles over a certain period. In other words, the number of particles over a period of time sets the flux level that is used to trigger an alarm condition. The counter 425 sets that period using a gate time signal 450. A user can set the period through the control module 435 and the control module 435 provides the gate time signal 450 to the counter 425. In one example, the gate time signal 450 is a clock signal generated by the control module 435 with a rising edge that latches the counter 425 and starts a new integration period. The clock signal can have a one to 50 microseconds pulse width and a pulse separation time of one millisecond to 10 seconds. The user can set these parameters, for example, using a computing device in communication with the command input port 445 of the control module 435. Alternatively, in a case where the control module 435 is not used, the SEU alarm 400 can include one or more switches that the user can set to adjust the period value.

The counter 425 outputs the state of the counter 425 to the comparator 430. When the comparator 430 determines that the state of the counter 425 has exceeded a count threshold, the comparator 430 generates an output signal on an alarm line 455 indicating that the threshold has been exceeded. For example, the output signal on the alarm line 455 can be a zero volt signal (e.g., logic zero) to indicate that the threshold has not been exceeded and a five volt signal (e.g., logic one) to indicate that the threshold has been exceeded.

The control module 435 also includes some optional ports 460, 465, 470, and 475. The control module 435 uses port 460 to transmit a calibration pulse across a capacitor 480. The control module 435 uses port 465 to transmit housekeeping telemetry to other systems that are monitoring parameters of the SEU alarm 400. For example, some of the parameters that can be included in the housekeeping telemetry are the LET threshold signal 440 (or digital equivalent), the gate time signal 450 (or digital equivalent), the output signal of the counter 425, the state of the alarm line signal 455, the measured temperature of the system 400, and spare data words for any additional signals. Ports 470 and 475 can be used to obtain the values of the output signal of the counter 425 and the state of the alarm line signal 455, respectively. In one example, the control module 435 samples the housekeeping telemetry parameters at 0.1 Hz to 1 Hz, and outputs an 8 bit signal from port 465 at a rate of 4.8 to 48 bits per second. The power to control module 435 at port 480 can be +15V, −15V, and/or +5V.

The SEU alarm 400 outputs a single alarm line signal 455 (e.g., a single bit) to indicate whether a threshold has been passed. The process 300 described a multiple threshold scenario where there was an indication of both a minimum level exceeded and a maximum level exceeded (e.g., two bits). The SEU alarm 400 can be used in a variety of ways to implement a multiple level threshold scenario. In one example, multiple SEU alarms 400 can be used in parallel, with each being set at different threshold levels (e.g., using the user adjustable LET threshold signal 440 and/or the user adjustable gate time signal 450). In another example, the housekeeping telemetry data output on port 465 can be used. For example, the output of the counter 425 can be used to indicate some minimum threshold has been exceeded (e.g., radiation detected), and then the alarm line signal 455 can be used to indicate a maximum threshold has been exceeded.

Figure 5:
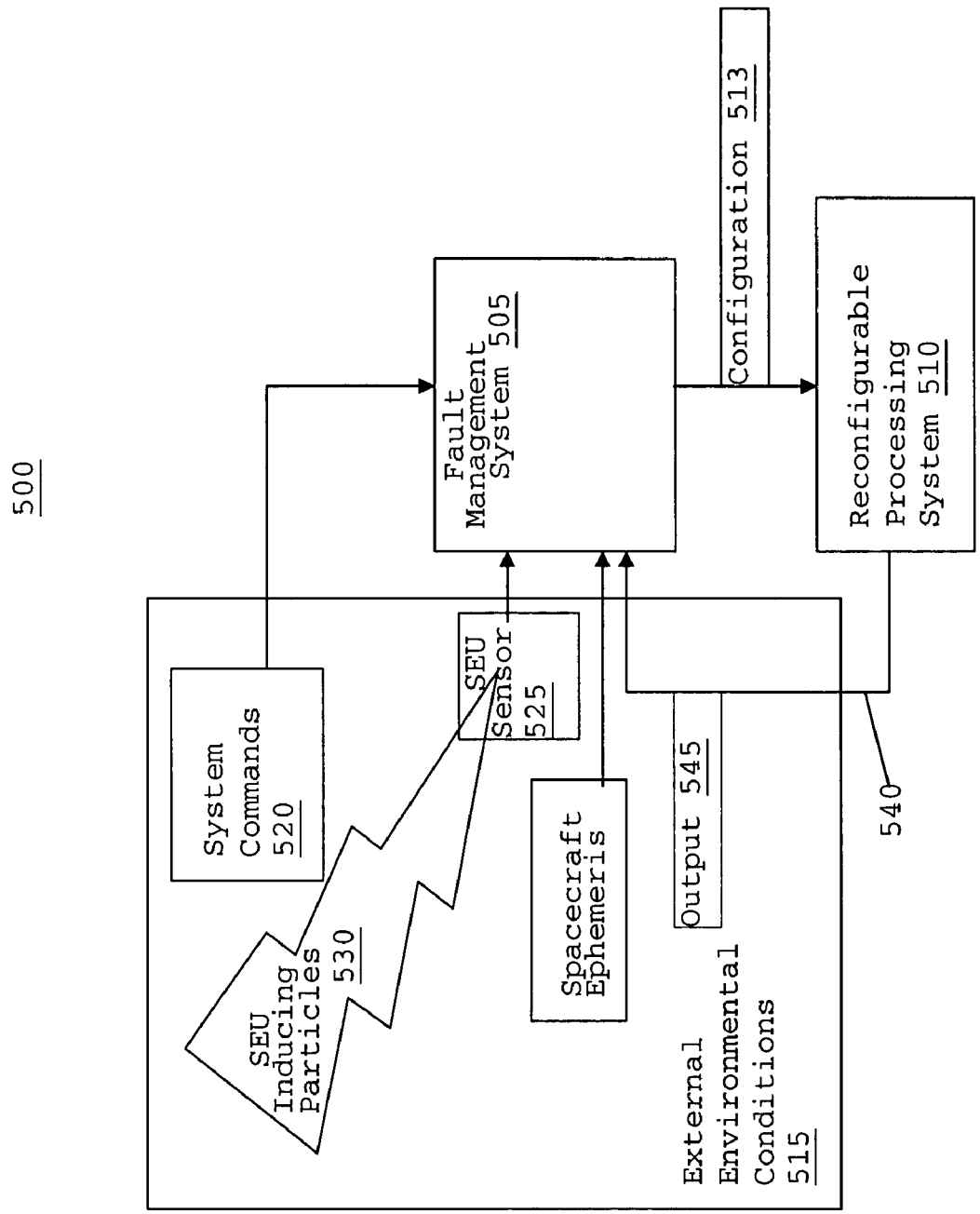
FIG. 5 is a block diagram of an exemplary reconfigurable environmentally adaptive computing system for use in space.

FIG. 5 illustrates a system 500 that can be used for reconfigurable, environmentally adaptive computing in space. The system 500 includes a fault management system 505 and a reconfigurable processing system 510. The reconfigurable processing system 510 reconfigures itself based on a selected configuration 513 transmitted by the fault management system 505. The fault management system 505 serves as the controlling element to select the configuration 513 from a group of predefined configurations for the reconfigurable processing system 510. The fault management system 505 selects the configuration 513 based on multiple inputs representing external environmental conditions 515.

One input is from a detector 520, which monitors system commands of the spacecraft in which system 500 resides. The system commands are commands originating from a user or autonomous mission control software. Any commands that are indicative of what is happening in the external environment can be used by the fault management system 505 to select a configuration and reconfigure the reconfigurable processing system 510 based on those environmental conditions. For example, the detector 520 can monitor commands for the environmental systems, such as temperature control, humidity control, airflow, etc. to determine the appropriate configuration for the appropriate environmental conditions. For example, the fault management system 505 can select a more redundant configuration in a high temperature environment, when the reconfigurable device is more prone to failures. When the temperature decreases again, the fault management system 505 can select a less redundant, higher performance, lower power configuration. The detector 520 can monitor commands from the navigation systems, such as commands for sudden changes in orbit that might be lead to more failure prone output data and again, select a more redundant configuration only when needed.

Another input is from a SEU detector 525 (e.g., a SEU alarm, such as 235 or 400), which monitors SEU inducing particles 530 in the environment that might cause a SEU. As described in some of the examples above, output signals from the SEU detector 525 that are indicative of the external environment can be used by the fault management system 505 to select the configuration 513 and reconfigure the reconfigurable processing system 510 based on the environmental conditions.

Another input is from a detector 535, which monitors the spacecraft ephemeris. Output signals from the spacecraft ephemeris detector 535 are indicative of the location of the spacecraft in its orbit and can be used by the fault management system 505 to select the configuration 513 and reconfigure the reconfigurable processing system 510 based on that location. The fault management system 505 can use the location data in a variety of ways. For example, certain locations may be more prone to cause faults because of different characteristics of that location (e.g., higher interference, higher noise, higher radiation, etc.). For these reasons, a higher reliability configuration can be selected based on that location. In other cases, particular locations may be of greater interest than other locations. For example, the reconfigurable processing element of the configuration system 510 is processing image data and previously at a certain location there was something interesting in the image data, but not quite discernable because the image was recorded using a low resolution processing configuration. The next pass at that location, the fault management system 505 can select a configuration for higher resolution processing, so more detail is obtained.

Another input is a feedback loop 540 that monitors the output data 545 of the reconfigurable processing system 510. For example, the fault management system 505 can include a detector (not shown) that receives and analyzes the output data 545 for certain characteristics. Based on those characteristics, the fault management system 505 selects a configuration. For example, the reconfigurable processing system 510 can be processing hyperspectral image data. Based on the output data, there can be particular wavelengths or wavelength bands that are of interest (e.g., show something unexpected). Based on that, the fault management system 505 can reconfigure the reconfigurable processing system 510 to focus on those wavelengths of interest. The output data 545 can also indicate certain characteristics of the reconfigurable processing system 510 itself. Based on one or more of those characteristics, the fault management system 505 can reconfigure the reconfigurable processing system 510 based on some cost function. For example, one characteristic can be the measured performance in terms of work done (e.g. MIPS, bandwidth, memory utilization, etc.). Another characteristic can be a measure of the actual power consumed by the system 510. Another characteristic can be the present health of the system 510.

Figure 6:
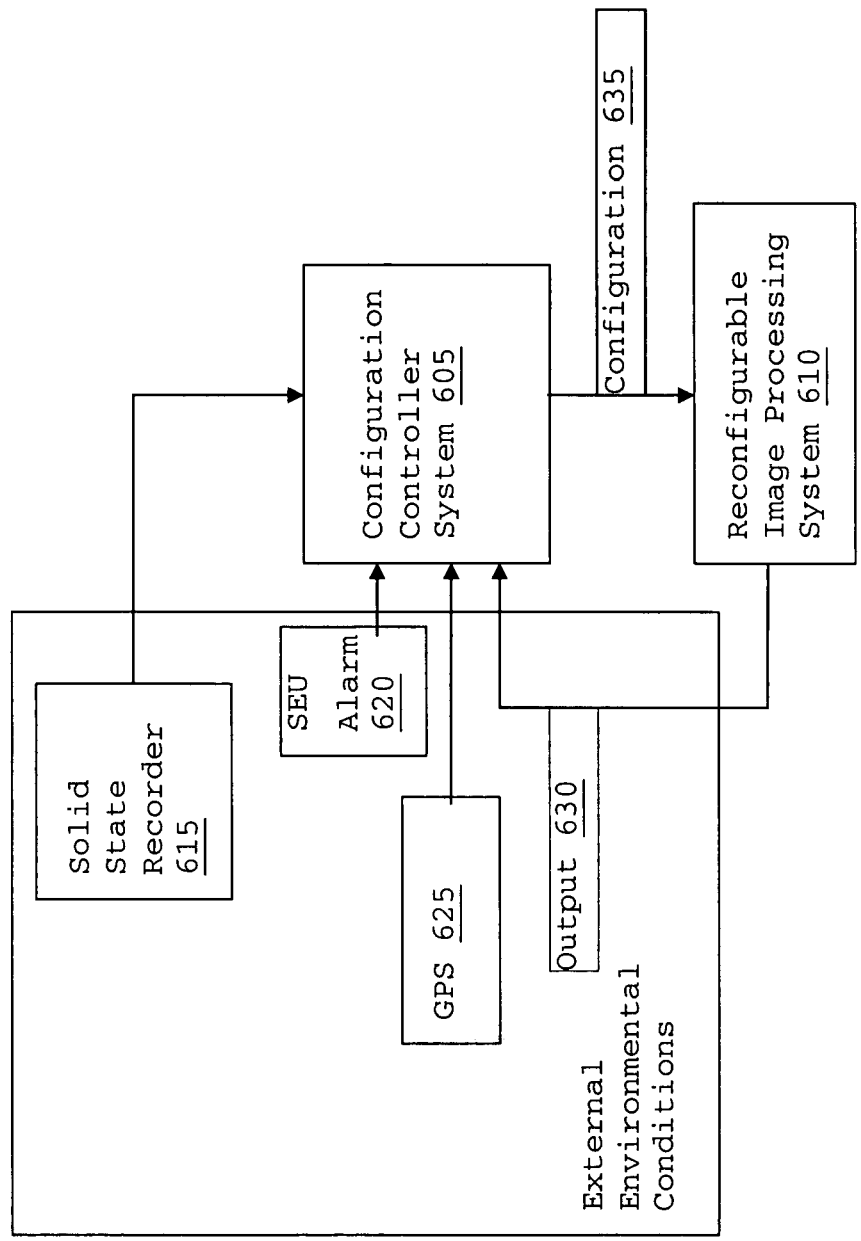
FIG. 6 is a block diagram of an exemplary reconfigurable environmentally adaptive computing system with multiple inputs.

FIG. 6 illustrates a system 600 that for reconfigurable environmentally adaptive computing that uses multiple inputs. The system 600 includes a configuration controller system 605 and a reconfigurable image processing system 610. The configurations from which the configuration controller system 605 can select are levels of compression of the image data, and include lossless, lossy, and very lossy. One input is the state of a solid state recorder 615. The states can be, for example, nearly empty or nearly full. Another input is the state of a SEU alarm 620. The states can be, for example, low or high, with high indicating the exceeding of a maximum threshold of particles. Another input is a GPS 625, indicating an accurate location. Another input is the monitoring of the image data 630 to determine an environmental event represented in the data 630. Based on the states of these inputs, the configuration control system 605 determines a configuration 635 (e.g., lossless, lossy, and very lossy) and transmits the configuration to the reconfigurable image processing system 610. Table 2 shows a portion of a selection table that the configuration control system 605 uses to determine the configuration 635.

TABLE 2

| Hyperspectral Imager (630) | GPS (625) | SEU Alarm (620) | Solid State Recorder (615) | Compression Type (635) |
|---|---|---|---|---|
| Chemical Vapor Plume | Baghdad | Low | Nearly Empty | Lossless or None |
| Noisy Data | Any | High | Any | Very Lossy |
| Artic Tundra | Northern Canada | Any | Nearly Full | Lossy |
| Hurricane | Caribbean | Low | Nearly Empty | Lossless or None |

Figure 7:
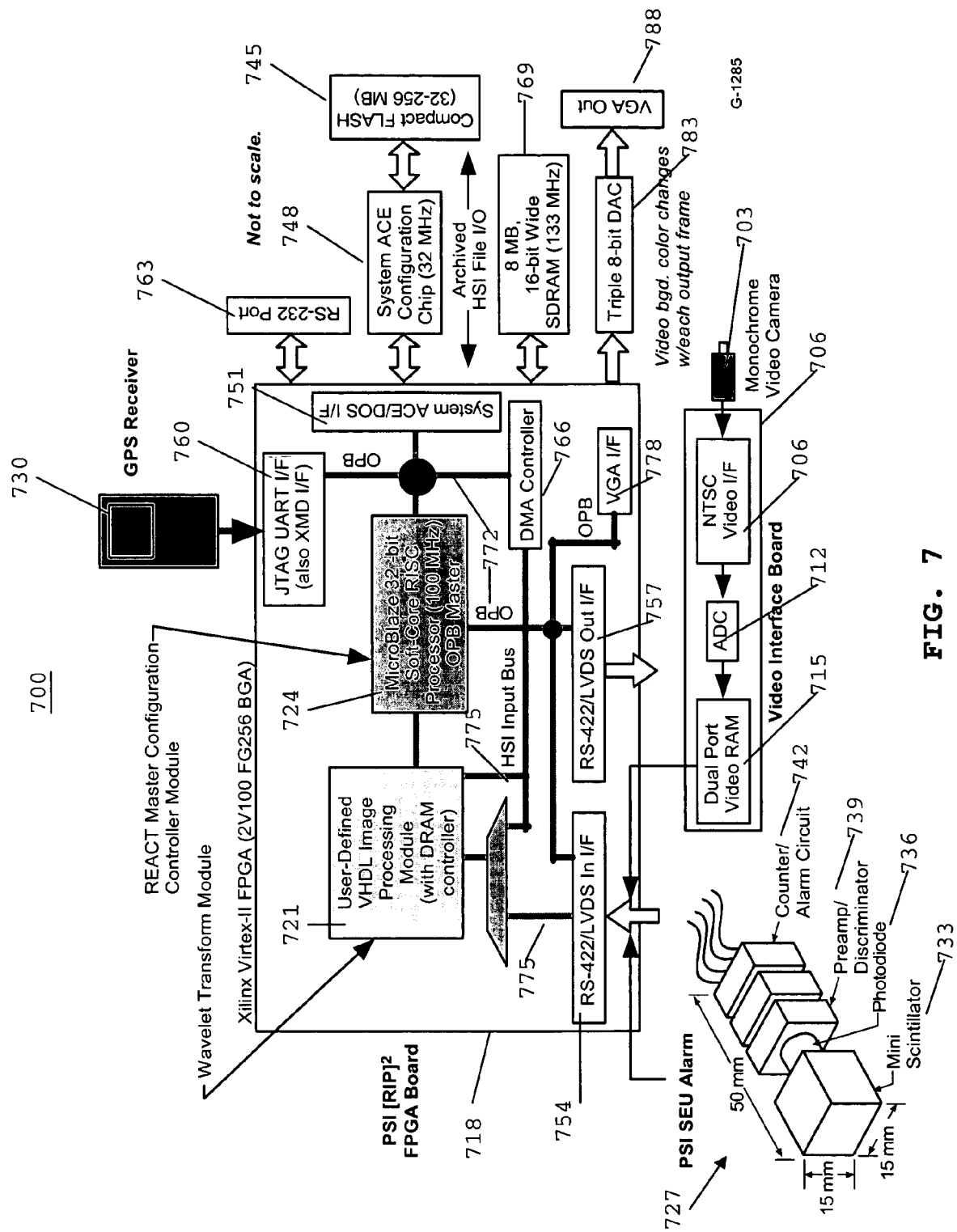
FIG. 7 is a block diagram of an exemplary reconfigurable environmentally adaptive computing system that processes image data.

FIG. 7 is a block diagram of another exemplary reconfigurable environmentally adaptive computing system 700 that processes image data. System 700 captures image data using a video camera 703 and a video interface board 706. The video interface board 706 includes a national standards television committee (NTSC) video interface 709, an analog-to-digital converter (ADC) 712, and a non-persistent storage module 715 (e.g., dual port video random access memory (RAM)). In capturing the image data, the NTSC video interface 709 receives an analog signal from the video camera 703 and transmits that analog signal representing the raw image to the ADC 712 for conversion into a digital format (e.g., logical ones and zeros). The raw image data, in digital format, is temporarily stored in the memory module 715 until the video interface board 706 can transmit the digital image data to a reconfigurable FPGA 718 for processing. The reconfigurable FPGA 718 can be implemented using, for example, a Xilinx® Virtex-II family FPGA (e.g., P/N 2V100 FG 256 BGA) manufactured by Xilinx, Inc. of San Jose, Calif.

To process the image data, the FPGA 718 includes a reconfigurable wavelet transform module 721. A wavelet transformation is a two-parameter expression of a signal in terms of wavelet basis functions. System 700 includes three configurations of the wavelet transform module 721 corresponding to lossless compression, lossy compression, and very lossy compression. The lossless compression configuration implements a 5/3 wavelet transform. The lossy compression configuration implements a 9/7 wavelet transform using high-precision fixed-point wavelet coefficients. The very lossy compression configuration implements a 9/7 wavelet transform using low-precision fixed-point wavelet coefficients.

One of these three configurations is selected by a master configuration controller module 724. The controller module 724 is also included in the FPGA 718. The controller module 724 selects a configuration based on the input from two detectors, a SEU alarm 727, and a GPS receiver 730. The SEU alarm 727 includes a mini scintillator 733, a photodiode 736, a preamp/discriminator module 739, and a counter/alarm circuit 742. Similar to the examples above, the SEU alarm 727 monitors particles in the environment that can cause a SEU and outputs a signal to indicate whether a certain threshold has been exceeded, indicating a increased probability of a SEU. The SEU alarm 727 outputs to the FPGA an alarm signal with two states, a low state, indicating the threshold has not been reached, and a high state, indicating a threshold has been reached. The GPS receiver 730 calculates a location and sends the location data to the FPGA 718.

TABLE 3

| SEU Alarm State | Camera/GPS Receiver State | 2D Wavelet Transform |
|---|---|---|
| Low | Camera pointing at a target of interest | 5/3 Lossless |
| Low | Target of interest outside of camera field of vision (FOV) | 9/7 Lossy |
| High | Any | 9/7 Very Lossy |

Table 3 shows an exemplary selection table used by the controller module 724 to select a configuration for the wavelet transform module 721. As shown, when the output signal of the SEU alarm 727 is in a low state, the controller module 724 uses the GPS data to determine whether the compression configuration should be lossless or lossy. When the camera 703 is pointing at a target of interest, then the controller module 724 selects a lossless compression. To make the determination of whether the camera is pointed at a target of interest, the controller module 724 can have, for example, a list of location coordinates that indicate the camera is pointing at a target of interest. In this example, the controller module 724 compares the location coordinates from the list to the received coordinates, and if there is a match (or the coordinates are within a listed range), then the camera is pointing to a target of interest. When the camera 703 is not pointing at a target of interest, then the controller module 724 selects a lossy compression. When the output signal of the SEU alarm 727 is in a high state, the controller module 724 selects the very lossy compression, regardless of the coordinates received from the GPS receiver 730. With the potential for poor quality data due to the high SEU rates, the controller module 724 minimizes resources used during this state.

In one example, the FPGA 718 is a partially reconfigurable FPGA, so that the wavelet transform module 721 can be reconfigured while the other modules (e.g., 724, 751, 754, 757, etc.) also implemented in FPGA 718 remain intact. In another example the FPGA 718 is physically implemented using several FPGA chips, with different modules implemented in different FPGA chips. For examples using one or more Xilinx® FPGAs, Xilinx® Inc. also manufactures a system advanced configuration environment (System ACE) solution that includes a storage module 745 and a controller chip 748. The storage module 745 is a persistent memory device (e.g., flash memory) that stores all of the configuration data for the one or more FPGAs used to implement the FPGA 718. The controller chip 748 has the control logic to obtain the requested configuration data (e.g., from configuration controller module 724) and directed that selected configuration data stream accordingly. The FPGA 718 includes a system ACE interface module 751 to communicate with the controller chip 748.

The SEU alarm 727 and the video interface board 706 communicate with the FPGA 718 using a serial differential bus, such as RS-422 or low voltage differential signaling (LVDS). The signals from the SEU alarm 727 and the video interface board 706 are received by a RS-422/LVDS input interface module 754. The FPGA 718 also includes a RS-422/LVDS output interface module 757. The GPS receiver 730 communicates with the FPGA 718 via a joint test action group (JTAG) universal asynchronous receiver/transmitter (UART) interface module 760. The FPGA 718 can also communication with other modules in the system 700 through a RS-232 serial port 763.

The FPGA 718 also includes a direct memory access (DMA) controller module 766 that enables the on-the-chip-peripheral bus (OPB) 772 and the hyperspectral imaging (HSI) input bus 775 to directly access an external memory module, such as memory module 769. The FPGA 718 also includes a video graphics array (VGA) interface module 778 to transmit the digital image data to a digital-to-analog converter (DAC) module 785. The DAC 785 produces a VGA compliant output 788 that can be displayed on a VGA monitor.

The examples above list some exemplary applications for a reconfigurable, environmentally adaptive computing system. Other example applications can include, but are not limited to, the following examples: autonomous radiation protection for image processors in hostile environments; dynamically tunable image compression based on geographic location, target priority, and/or data quality for surveillance or medical diagnostics; adaptive beam forming and filtering for communications, sonar, radar, and other high-bandwidth interferometry applications; adaptive networking and cueing for sensor arrays based on external inputs such as device diagnostics, features of datastreams, or geographic location; autopilot and collision avoidance in hostile environments (e.g., underwater, low-visibility etc.); near real-time matched filtering, automatic target recognition, and object-level change detection for high-bandwidth remote sensors; and data fusion engines for multi-sensor suites.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention has been described in terms of particular embodiments. The alternatives described herein are examples for illustration only and not to limit the alternatives in any way. The steps of the invention can be performed in a different order and still achieve desirable results. Other embodiments are within the scope of the following claims.

What is claimed is:

1. An adaptive computing system comprising:
   a detector that generates an environmental signal representative of an external environmental condition;
   a controller element that receives the environmental signal from the detector and selects a processing configuration from a plurality of processing configurations based on the environmental signal, the plurality of processing configurations comprising a first configuration and a second configuration that is different from the first configuration, the second configuration being more reliable than the first configuration, more redundant than the first configuration, higher powered than the first configuration, or any combination thereof; and a processing element that reconfigures its programmable logic to change the way input signals are processed in accordance with the selected processing configuration received from the controller.

2. The adaptive computing system of claim 1, wherein the detector comprises a sensor.

3. The adaptive computing system of claim 2, wherein the sensor comprises a radiation detector.

4. The adaptive computing system of claim 3, wherein the radiation detector comprises a scintillator and a photo-diode.

5. The adaptive computing system of claim 2, wherein the sensor comprises a location detector.

6. The adaptive computing system of claim 5, wherein the location detector comprises a geographical positioning system sensor.

7. The adaptive computing system of claim 1, wherein the detector comprises a single event upset detection circuit comprising a radiation detector.

8. The adaptive computing system of claim 1, wherein the detector comprises a radiation detector and a location detector.

9. The adaptive computing system of claim 1, wherein the detector comprises an image processing detection circuit.

10. The adaptive computing system of claim 9, wherein the environmental signal is based on a characteristic of a processed image.

11. The adaptive computing system of claim 10, wherein the characteristic comprises a particular feature within the processed image.

12. The adaptive computing system of claim 10, wherein the characteristic comprises an unexpected feature within the processed image.

13. The adaptive computing system of claim 1, wherein the processing element comprises a programmable logic device.

14. The adaptive computing system of claim 13, wherein the programmable logic device comprises a field programmable gate array.

15. The adaptive computing system of claim 1, wherein the processing element comprises a radiation-hardened programmable logic device.

16. The adaptive computing system of claim 1, wherein the environmental signal is based on a characteristic of output data from the processing element.

17. The adaptive computing system of claim 1, wherein the processing element can accommodate high bandwidth applications.

18. A method comprising:
receiving an environmental signal representative of an external environmental condition;
selecting a processing configuration from a plurality of processing configurations based on the environmental signal, the plurality of processing configurations comprising a first configuration and a second configuration that is different from the first configuration, the second configuration being more reliable than the first configuration, more redundant than the first configuration, higher powered than the first configuration, or any combination thereof; and
reconfiguring a programmable logic of a processing element to change the way input signals are processed according to the selected processing configuration.

19. The method of claim 18, further comprising:
detecting the external environmental condition; and
generating the environmental signal based on the detected condition.

20. The method of claim 19, wherein detecting comprises detecting a radiation level.

21. The method of claim 20, wherein the processing configuration is a first processing configuration, the method further comprising:
detecting an increase in the radiation level, and
selecting a second processing configuration that is more fault tolerant than the first processing configuration.

22. The method of claim 19, wherein detecting comprises detecting a position.

23. The method of claim 19, wherein detecting comprises detecting a particular condition within image data.

24. The method of claim 23, wherein detecting comprises detecting a particular feature within the image data.

25. The method of claim 23, wherein detecting comprises detecting an unexpected feature within the image data.

26. A computer program product, tangibly embodied in a computer and/or a removable storage medium, for reconfigurable environmentally adaptive computing, the computer program product including instructions stored on a computer readable medium, which when executed by a computer, causing an apparatus to:
receive an environmental signal that represents an environmental condition external to the adaptive computing system;
select a processing configuration from a plurality of processing configurations based on the environmental signal, the plurality of processing configurations comprising a first configuration and a second configuration that is different from the first configuration, the second configuration being more reliable than the first configuration, more redundant than the first configuration, higher powered than the first configuration, or any combination thereof; and
initiate the reconfiguring of a programmable logic of a reconfigurable processing element to change the way input signals are processed according to the selected processing configuration.

27. An adaptive computing system comprising:
a means for generating an environmental condition signal;
a means for selecting a processing configuration from a plurality of processing configurations based on the environmental condition signal, the plurality of processing configurations comprising a first configuration and a second configuration that is different from the first configuration, the second configuration being a reliable than the first configuration, more redundant than the first configuration, higher powered than the first configuration, or any combination thereof; and
a means for reconfiguring a programmable logic of a processing element to change the way input signals are processed according to the selected processing configuration.

28. The adaptive computing system of claim 1, wherein the plurality of processing configurations further comprises a third configuration that is different from the first and second configurations, the third configuration being more reliable than the first or second configuration, more redundant than the first or second configuration, higher powered than the first or second configuration, or any combination thereof.

29. The adaptive computing system of claim 1, wherein the external environmental condition represents an unscheduled change.

30. A method comprising:
- receiving a first environmental signal representative of a first external environmental condition;
- operating according to a first processing configuration corresponding to the first external environmental condition;
- receiving a second environmental signal representative of a second external environmental condition, the second external environmental condition being different from the first external environmental condition;
- selecting a second processing configuration corresponding to the second external environmental condition, the second processing configuration being different from the first processing configuration, wherein the second processing configuration is more reliable than the first processing configuration, more redundant than the first processing configuration, higher powered than the first processing configuration, or any combination thereof;
- reconfiguring a programmable logic of a processing element to change the way input signals are processed according to the second processing configuration; and
- operating according to the second processing configuration.

31. The method of claim 30, wherein the second external environmental configuration is more harsh than the first external environmental configuration.

* * * * *